3,123,701
CONTROL DEVICE RESPONSIVE TO
ICE-FORMING CONDITIONS
Joseph Edward Padgett, Jr., Traverse City, Mich., assignor to Parsons Corporation, Traverse City, Mich., a corporation of Michigan
Filed Jan. 3, 1961, Ser. No. 80,100
6 Claims. (Cl. 219—19)

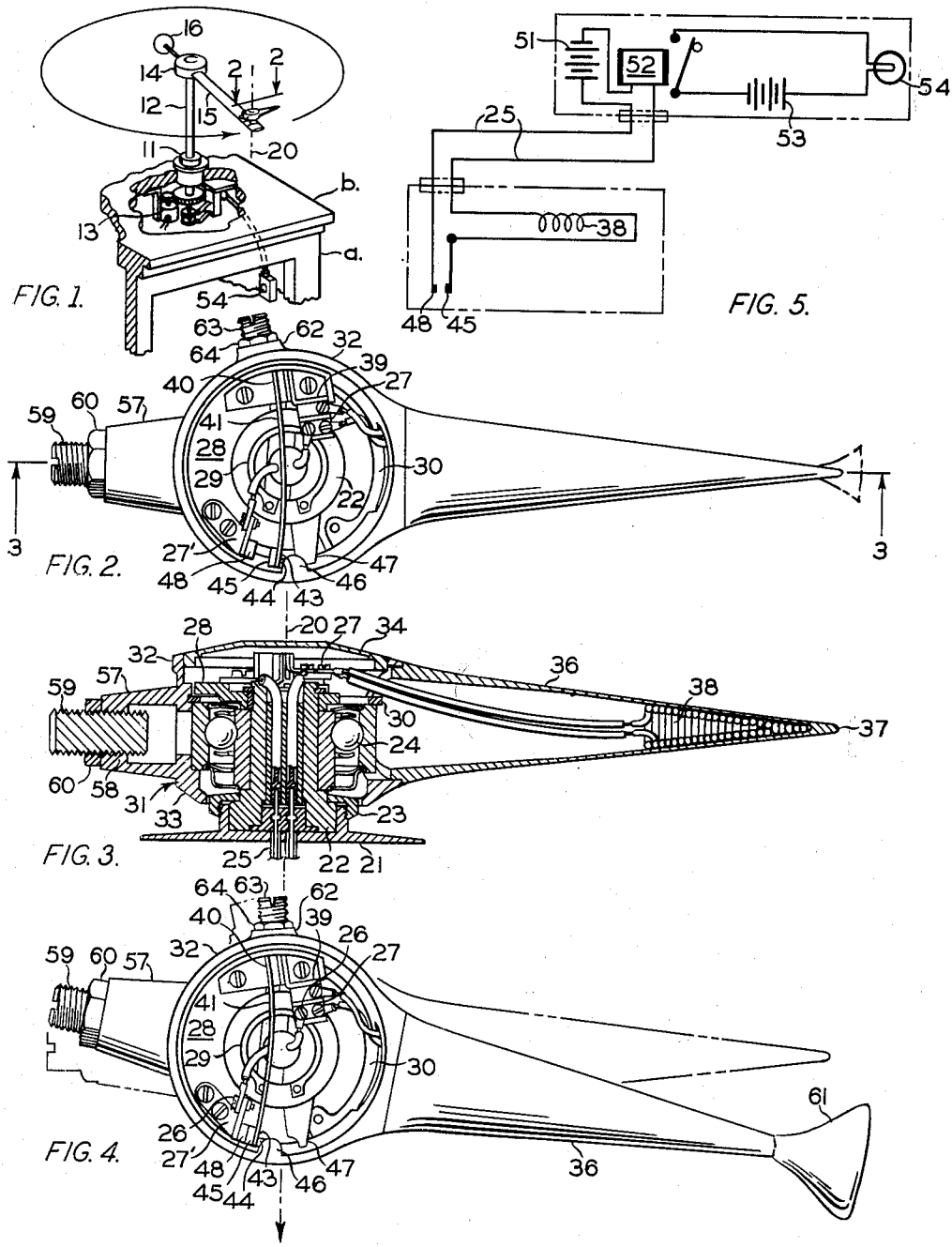
March 3, 1964     J. E. PADGETT, JR     3,123,701
CONTROL DEVICE RESPONSIVE TO ICE-FORMING CONDITIONS
Filed Jan. 3, 1961
INVENTOR
JOSEPH EDWARD PADGETT, JR.
BY
HIS ATTORNEY ID # United States Patent Office 3,123,701
Patented Mar. 3, 1964

The present invention relates to devices responsive to ice-forming conditions of the atmosphere.

It is known that a tapering, pointed member presented into a relative wind will, under certain conditions of temperature and humidity, accrete or collect ice from the moisture of the relative wind, not evenly over the surface of the pointed member but rather on the forwardly-presented point. For practical purposes, we may denominate the tapering point of the member as the locus of ice accretion.

This invention may be summarized generally as a control device drawn through the atmosphere and turned about a center so as to be subject to centrifugal forces. It includes an arm rotated by a source of rotational energy about a center of rotation. A pivot mounted on the rotating arm turns substantially in a plane and describes a circle about the center of rotation. The pivot axis is transverse to the plane of rotation. On the pivot is supported a conical or tapering pointed member and a housing. These supported members are substantially balanced under the centrifugal forces in a normal forwardly-directed position, when no ice is present. When a deposit of ice is accumulated at the locus of ice accretion, the centrifugal force upon the ice mass unbalances the pivot-supported assembly and deflects it angularly about the pivot to a second position, which may be referred to as the over-balanced position. Such angular deflection operates a control, which may be a simple two-position electric switch, which actuates a de-icing heater and also controls any desired secondary system.

The movement between the two positions is preferably less than 45°. In order to achieve stability in the normal position, so that the device will not be deflected by random forces or by the accumulation of less than a predetermined mass of ice, the centroid of the masses supported on the pivot is preferably fixed with reference to a line connecting the pivot and the center of rotation. The preferred position of the centroid is radially inward of the pivot and aft of the line at an angle not over 45° from such line. The ice-accreting member is preferably presented more than 45° forward of such line. With the two angular positions separated by less than 45°, the centrifugal force acting at the centroid will stabilize the ice-accreting member so that it tends to point forwardly. The centrifugal force which acts on a mass of accreted ice will tend to overcome this stabilizing force, and thus turn the supported masses on the pivot to the second, overbalanced position. This brings the centroid closer to the line, reducing its stabilizing force, but maintaining such force at a positive value so that when the ice has been substantially removed, the pivoted member will swing back to the normal position.

A preferred embodiment of the present invention is illustrated in the accompanying drawings, in which:

FIGURE 1 is a schematic perspective view of a detection device for icing conditions, mounted onto the roof of an observer's cabin.

FIGURE 2 is a plan view of the detector mechanism as seen along line 2—2 of FIGURE 1, with its housing cap removed.

FIGURE 3 is a sectional view taken along line 3—3 of FIGURE 2.

FIGURE 4 is a view corresponding to FIGURE 2, with an amount of ice accreted thereon sufficient, under the centrifugal force indicated by the arrow, to deflect the housing from its original position shown in phantom lines to the deflected position shown in solid lines.

FIGURE 5 is a simplified wiring diagram showing, in the upper rectangle, the elements within the observer's cabin, and in the lower rectangle, the rotating elements.

The type of installation depicted in FIGURE 1 shows, fragmentarily, an observer's cabin, generally designated $a$. The cabin roof $b$ has a sealed bushing 11 which supports a vertical, rotatable, hollow mast 12 powered, from a source of electricity not shown, by a geared motor 13. The mast 12 extends upward sufficiently above the roof $b$ to extend into the relatively free air stream.

A hub 14 at the top of the mast 12 mounts a rotatable hollow arm 15 which preferably extends radially and is quite rigid. The arm 15 may have a 180° counterweight as at 16.

Located on the arm 15 outward from the center of rotation of the mast 12 and hub 14, is a pivot axis 20 as shown in FIGURES 1 and 3, essentially transverse to the horizontal plane of rotation. Its distance from the center of rotation of the hub 14 is selected to provide a desired tangential velocity under the preferably constant speed of rotation of the mast 12. In the specific embodiment shown, the axis 20 is established by a mounting flange 21 secured onto the rotatable arm 15. Extending vertically upward is a hollow spindle pivot 22, fastened fixedly within the mounting flange 21 by a mounting nut 23 as shown in FIGURE 3. A bearing, such as the ball bearing assembly 24, is mounted rotatably on the pivot 22 to permit angular movement, in a plane substantially parallel to the plane of rotation of the arm 15. Through the hollow spindle of the pivot 22 are drawn the electric leads 25, which pass through the arm 15 and mast 12 to the observer's cabin $a$ as hereinafter described. From the upper end of the pivot 22, these leads 25 continue to terminals 26 secured to conductive terminal posts 27, 27', which are mounted on a fixed platform 28 keyed onto the upper end of the pivot 22, as by a snap ring 29.

Onto the outer race of the bearing 24 is mounted, by a larger snap ring 30, a rotatable housing generally designated 31. It comprises a housing body 32 of nearly cylindrical form as shown in FIGURES 2 and 4, having a lower circular flange 33 which overhangs the mounting nut 23 with clearance so as to avoid binding by the formation of ice. The upper end of the housing body 32 is equipped with a circular cap 34, shown in place in FIGURE 3 but removed in both FIGURES 2 and 4.

Projecting from the forward side of the housing body 32 is a conical-tapering, hollow, ice-accreting member 36 which has a closed, forwardly-projecting point 37. The wall of the hollow ice-accreting member 36 near its point 37 is sufficiently thin and heat-conductive (such as metal) as to permit de-icing by an electrical resistance heater 38 contained within it. The heater 38 may consist of a simple resistance wire twisted into a conical loop as shown in FIGURE 3, with one lead joining the terminal post 27, and the other lead connected to a spring-base terminal post 39, screwed or otherwise mounted onto the fixed platform 28.

Secured to the terminal post 39 by its base end 40, and extending horizontally across the platform 28 above the top of the pivot 22, is a leaf spring designated 41, formed of electrically-conductive metal. It is positioned vertically edgewise, so that it may flex in the horizontal plane. It is electrically conductive from its base end 40, where it joins the terminal post 39, to its contact end 43, where it is fitted on the forward side with a bumper 44 and on its aft side with an electrical contact 45. A vertical ridge 46 formed on the inner side of the housing body 32 and shown as semi-circular, bears against the spring's bumper 44; and bends the spring 41 backward to the slightly-flexed position shown in FIGURE 2 when the point 37 extends straight forward. Movement of the point 37 inward of this position is prevented by contact of the ridge 46 against a stop blade 47 which extends radially outward from the platform 28. The flexual resistance of the spring 41 increases when, as hereinafter described, the housing 31 is moved by centrifugal force from the position shown in FIGURE 2, in which the electrical contact 45 is open, to the position shown in FIGURE 4, in which the electrical contact 45 is closed against a fixed electrical contact 48 supported on the terminal post 27. The angular movement of the housing 31 is thus limited by two stops: the fixed electrical contact 48 and the stop blade 47.

When the circuit is wired as illustrated in FIGURE 5, current from an electric power source (indicated generally as a storage battery 51) passes in series through the resistance heater 38 and a "normally off" relay 52, actuating it to make a second circuit between a second electric power source 53 and some appropriate actuated system, of which the simplest embodiment would be an indicator light 54, located within the observer's cabin a. Normally such an indicator will be desired, to signal the presence of icing conditions; alternately, however, the second electrical system, actuated by the relay 52 or in other known ways, may include recorders, transducers, and other controls for miscellaneous secondary systems.

The desired manner of operation being clear, it becomes necessary that the masses, subject to the centrifugal force attending rotation about the hub 14, be balanced against each other. In the embodiment shown, excess counter-balancing is provided to avoid false signals which might otherwise result from vibrations or the accretion of such minor amount of ice (as shown in dashed lines in FIGURE 2) which may be predetermined to be insignificant.

To provide for initial balance of the masses under the centrifugal forces, the housing body 32 has an aft-projecting, truncated conical portion 57, disposed diametrically opposite from the ice-accreting member 36. It terminates in an inwardly-extending, internally-threaded flange 58 which bears a heavy screw counterweight 59, adjusted radially to balance the mass of the elements projecting forwardly from the housing 31 (specifically the ice-accreting member 36 and the resistance heater 38) and then secured by a lock nut 60. Since the locus of ice accretion will for all practical purposes be the point 37 of the ice-accreting member 36, the effect of centrifugal force on the mass of accreted ice will be to overcome or overbalance the previously-counterbalanced masses and actuate the switch as heretofore described.

The leaf spring 41 provides some resistance to overbalancing which increases slightly with deflection. However, to provide a stronger force to resist false signals, without shutting off the de-icing heater before its work has been completed, it is desirable that as the housing 31 turns to close the switch, the restoring force should be lessened rather than increased.

For this purpose, a secondary counterweighting system is provided. This consists of an internally-threaded housing boss 62, located as hereinafter described, bearing a second adjustable screw counterweight 63 and its lock nut 64. The boss 62 is positioned at the inner side of the housing body 32, that is, on the side toward the center of rotation of the hub 14; throughout the range of angular movement of the housing 31 it remains aft of a line connecting such center with the pivot axis 20. In the embodiment shown, the angle of movement between the de-iced position shown in FIGURE 2 and the ice-accreted position shown in FIGURE 4 is only 10°. When the housing 31 is in the switch-open position shown in FIGURE 2, the angular position of the second counterweight 63 is approximately 15° aft of such connecting line. In the switch-closed position shown in FIGURE 4, it remains 5° aft of the connecting line. Since the centrifugal force on it acts outward, the moment arm of the centrifugal force on the second counterweight 63 will be reduced greatly by its movement from the position of FIGURE 2 to the position of FIGURE 4.

Summarizing, in the absence of accreted ice, the effect of the centrifugal force on the second counterweight 63 is to provide a predetermined extent of stability to the pivoted masses, by pressing the housing ridge 46 firmly against the stop blade 47 in the absence of a substantial accretion of ice. However, when a mass of accreted ice 61 develops moment, under centrifugal force, as to overbalance this stabilizing force, it will turn the housing 31 to the de-icing position shown in FIGURE 4, at which the effect of the second counterweight 63 is minimized. The de-icing will therefore continue without interruption until it dislodges the accreted mass, at which stage the centrifugal force applied by the counterweight 63, and aided by the restoring moment of the leaf spring 41, returns the housing 31 to its forward position, turning off the de-icer heater and de-actuating the secondary system operated by the relay 52.

The precise angular positions given are not controlling; if desired a single equivalent counterbalance mass may obviously be substituted for the two masses 59 and 63. To obtain such excess counterbalancing, however, the total pivoted mass (here made up of the housing 31, the ice accreting member 36, the resistance heater 38, the truncated conical portion 57, and the screw counterweights 59 and 63 and their associated parts) should have a mass centroid which, in the switch-open position, is located on radially-inward side, at an angle less than 45° aft of a line connecting the pivot axis 20 with the center of rotation. The point upon which ice accretes need not necessarily be designed to be directed straight forward of the pivot axis 20 (although I deem this to be advantageous); but at least it should be presented spaced forward of the pivot axis 20 and at an angle greater than 45° from such a line connecting the pivot axis 20 with the center of rotation. In such a system stabilized by excess counterbalancing, the permissible angular movement of the ice-accreting member 36 may be as great as 45°.

Should no excess of counterbalancing be utilized—as for example if the restoring force of the spring 41 were alone relied upon—even greater angular travel might be permitted the ice-accreting member 36. In such case, the outward swing of the ice-accreting member under the centrifugal force of accreted ice, must practically be limited to one quadrant of a circle, or 90°.

In that the pivoting mechanism has a curved path which subjects it to centrifugal forces, and makes and breaks an electrical circuit at the contact points 45, 48, it is essentially an electric switch automatically operated by centrifugal force exerted by a mass accreted out of a fluid and deposited upon the device remote from the pivot. In certain installations, types of controls other than an electric switch might be employed.

While I have described and shown a tapering, pointed ice-collecting member, bodies of other shapes may also serve the function of collecting ice at a predetermined locus of ice accretion. For example, there might be substituted a cylinder whose axis was aligned with the relative wind, and having a blunt forward end incorporating a de-icing element; the difference in adherence of accreted ice onto such forward end might be desirable in some installations.

The form of housing shown may be varied; and for continued use under extreme conditions, additional areas may be provided with de-icing heaters. Other modifications of construction and use of the present disclosure will be apparent when the particular engineering problems of a given situation are considered. Accordingly, this invention should not be construed narrowly but instead as fully co-extensive with the claims hereof.

I claim:
1. A rotating control device responsive to ice-forming conditions of the atmosphere, comprising a source of rotational energy, an arm rotated thereby about a center of rotation, a pivot mounted on the arm remote from the center of rotation, the pivot having an axis transverse to the arm, an ice-accreting member angularly movable on the pivot and having a locus of ice accretion spaced radially from the pivot, operative positions of the ice-accreting member spaced angularly and including a balanced position and an over-balanced position, masses, including the mass of the ice-accreting member itself, whose centrifugal force acts on the ice-accreting member to urge it to the balanced position, subject to being over-balanced by the centrifugal force of accreted ice which urges the member to the over-balanced position, and a systems control operated by angular movement of the ice-accreting member and having a first position corresponding to the balanced position and a second position corresponding to the over-balanced position.

2. A rotating control device responsive to ice-forming conditions of the atmosphere, comprising a source of rotational energy, an arm rotated thereby about a center of rotation, a pivot mounted on the arm remote from the center of rotation, the pivot having an axis transverse to the arm, an ice-accreting member angularly movable on the pivot and having a forwardly-presented tapering point spaced radially from the pivot, stops limiting the angular movement of the ice-accreting member, thereby establishing a normal position and an ice-accreted position, and a systems control operated by angular movement of the ice-accreting member and having a first position corresponding to the normal position and a second position corresponding to the ice-accreted position.

3. A rotating control device responsive to ice-forming conditions of the atmosphere, comprising a source of rotational energy, an arm rotated thereby about a center of rotation, a pivot mounted on the arm for rotation in a plane, the pivot having an axis transverse to the plane of rotation, an ice-accreting member angularly movable on the pivot less than 45° and having a forwardly-presented tapering point spaced radially from the pivot and at an angle more than 45° from a line connecting the pivot and the center of rotation, stops limiting the angular movement of the ice-accreting member, thereby establishing a normal position and an ice-accreted position, the pivoted ice-accreting member having a mass centroid which in the normal position is radially inward and tangentially aft of the pivot at an angle not more than 45° from such line connecting the pivot and the center of rotation, and a systems control operated by angular movement of the ice-accreting member and having a first position corresponding to the normal position and a second position corresponding to the ice-accreted position.

4. A rotating control device as defined in claim 3, the ice-accreting member being hollow, and having means therein to de-ice said ice-accreting member responsive to its said angular movement.

5. A control device responsive to the presence of atmospheric icing conditions, comprising a member drawn through the atmosphere along a substantially circular path in a plane and supported on a pivot axis remote from the center of the path and transverse to the plane, means to balance the member on the pivot axis under centrifugal forces accompanying rotation in a first angular position, means to accrete a centrifugally-unbalanced deposit of ice on the member under icing conditions of the atmosphere and by such deposit to deflect such ice-accreting means angularly about said pivot to a second angular position, and a systems control operated by such angular deflection.

6. A control device responsive to the presence of atmospheric icing conditions, said device being of the type having a hollow ice-accreting member including a closed forward end projecting into the relative wind, characterized in that the ice-accreting member is rotated on an arm and balanced against centrifugal forces about a vertical pivot aft of the locus of ice accretion on said member, said pivot axis being outboard from the center of rotation of the arm, and contains control-operating means actuated by angular movement of the ice-accreting member responsive to the centrifugal force of accreted ice further characterized in that the closed forward end of the ice-accreting member contains means for de-icing the ice-accreting member, which means for de-icing is actuated by said control-operating means.

References Cited in the file of this patent

UNITED STATES PATENTS

| | | |
|---|---|---|
| 1,769,889 | McClaran et al. | July 1, 1930 |
| 2,566,813 | Thorsen | Sept. 4, 1951 |
| 2,820,958 | Fraser | Jan. 21, 1958 |
| 2,895,023 | Blum | July 14, 1959 |
| 2,911,812 | Metzger | Nov. 10, 1959 |